United States Patent Office 2,733,284
Patented Jan. 31, 1956

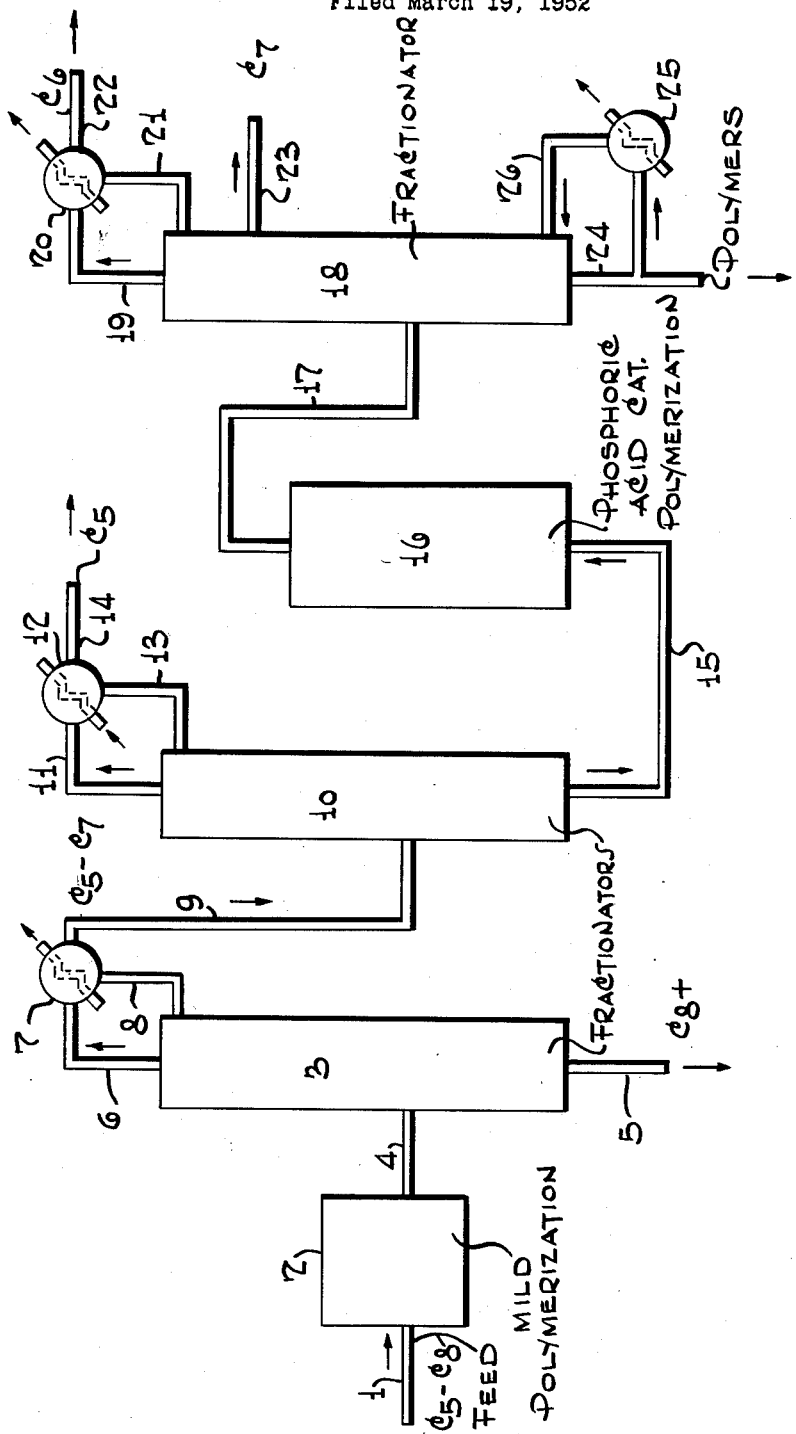

2,733,284

PROCESS FOR RECOVERY OF AROMATIC HYDROCARBONS BY DIMERIZING CYCLIC DIOLEFINS, DISTILLING TO OBTAIN A $C_6$—$C_7$ CUT, PHOSPHORIC ACID POLYMERIZING THE OLEFINS, AND DISTILLING TO OBTAIN AN AROMATIC RICH FRACTION

Glen P. Hamner, Baton Rouge, La., assignor to Esso Research and Engineering Company, a corporation of Delaware Application March 19, 1952, Serial No. 277,421

1 Claim. (Cl. 260—674)

The present invention deals with a process for recover $C_6$—$C_7$ aromatic hydrocarbon concentrates, particularly a benzene concentrate, from a vapor-phase cracked petroleum naphtha fraction by employing a phosphoric acid polymerization catalyst to remove olefins and diolefins from the boiling range of benzene and toluene.

Vapor-phase cracking, preferably in the presence of steam, at high temperatures of the order of 1000° F. to 1400° F. and under low pressures of 1 to 10 atm. applied to a petroleum gas oil stock or heavy naphtha yields products having a high content of aromatic hydrocarbons, olefins, and diolefins with relatively small amounts of paraffins. A cracking process of this type is described in U. S. Patent 2,363,903 patented November 28, 1944, by B. I. Smith and U. S. Patent 2,348,659 patented May 9, 1944, by B. I. Smith et al. These patents also describe certain methods of separating low-boiling fractions up to including a butadiene-containing fraction from the highly cracked products. Due to the complex composition of the higher-boiling cracked naphtha hydrocarbons, it is difficult to use conventional fractional distillation means for separating their valuable $C_5$—$C_7$ hydrocarbon components.

Benzene- and toluene-rich $C_6$ and $C_7$ fractions of the vapor-phase cracked products tend to contain some higher hydrocarbons and some $C_5$ hydrocarbons, at least on account of the azeotroping effect of the aromatic hydrocarbons with the other types of hydrocarbons and on account of the tendencies of some of the components, particularly cyclodienes, to polymerize and depolymerize at temperatures used in the fractional distillation.

In accordance with the present invention, a $C_6$—$C_7$ aromatic distillate fraction containing mainly olefins and diolefins with the aromatics is treated in the liquid phase with a phosphoric acid catalyst to convert the olefinc hydrocarbons to higher boiling hydrocarbons without substantial loss of benzene or toluene by alkylation, and thereafter the phosphoric acid treated materials can be fractionally distilled to recover a highly concentrated benzene or toluene distillate.

The specific effect of the phosphoric type polymerizing catalyst on the $C_6$—$C_7$ olefins and diolefins is indicated to depend not only on the polymerization conditions but also on the feed to the polymerization zone. The feed to the polymerization zone evidently should have very low content of paraffins of $C_5$ and lower hydrocarbons, or of highly reactive cyclic diolefins, such as $C_5$—$C_7$ cyclodienes.

Where a "phosphoric acid catalyst" or "$P_2O_5$ catalyst" is mentioned herein, the type of catalyst designated comprises various phosphoric acids, e. g., ortho or pyro phosphoric acid, on a solid carrier, usually a siliceous or solid adsorbent material. The preferred catalyst of this type is a composite of phosphoric acid on kieselguhr, calcined at above 400° F. and containing about 63–67 wt. per cent of phosphoric acid calculated as $P_2O_5$. Small amounts of water may be present and maintained in the catalyst.

The phosphoric acid catalysts have been used under certain conditions for polymerizing low boiling olefins and for alkylating aromatic compound with lower olefins, particularly with the olefins in gaseous phase. The phosphoric acid catalysts are used in the present process on $C_6$—$C_7$ hydrocarbon mixtures under conditions that minimize alkylation of the aromatic components during a reaction of certain olefins and diolefins.

For maximum recovery of benzene and toluene from a naphtha product, it is desirable to start with a $C_5$—$C_8$ fraction having an initial boiling point as low as 140° F. or lower even though with the present process ultimately a $C_6$—$C_7$ rich fraction substantially free of $C_5$ components is subjected to the action of a phosphoric acid catalyst. The $C_5$ components, which act unfavorably in the phosphoric acid treatment are effectively removed in the preliminary steps of mild polymerization followed by fractional distillation.

A schematic flow plan in the accompanying drawing will be used to describe a preferred method of applying the invention by pretreating the feed for the phosphoric acid polymerization step.

In the drawing a $C_5$—$C_8$ vapor-phase cracked distillate stream is indicated to be passed from line 1 into an initial mild polymerization zone in vessel 2. In this preliminary mild polymerization the main object is to selectively dimerize cyclodienes or to polymerize cyclodienes and branched diolefins which are highly reactive. For this initial selective polymerization, the hydrocarbon material may be soaked in liquid phase at temperatures of 180° to 240° F. for a period of 4 to 8 hours. The polymerizing vessel may be made to contain a mild polymerizing catalyst, such as activated clay, but the activated clay should be used under similar mild conditions to avoid excessive reaction.

Liquid effluent of the mildly polymerized liquid hydrocarbons from vessel 2 is passed into a fractionator 3 for separating the unpolymerized $C_5$—$C_7$ hydrocarbons by distillation from the polymers. Accordingly, the fractionating column 3 has to be operated under suitably controlled conditions for avoiding depolymerization of the polymers. With about 20 plates in column 3, the bottoms temperature is maintained at no higher than about 240° F. and with an overhead vapor temperature of 180° F. under a pressure of 10–15 p. s. i. g., the vapors taken overhead from fractionator column 3 will contain very small quantities of $C_8$ and higher boiling hydrocarbons. The $C_8$ and higher boiling hydrocarbons, including a small amount of high boiling $C_7$ hydrocarbons, are withdrawn as a bottoms product from column 3 through line 5. The overhead vapors are passed by line 6 to a partial condenser 7 to form some reflux returned to the upper part of column 3 by line 8, the remaining overhead vapors from column 3 are sent by line 9 to the next fractionating column 10.

Fractionating column 10 is operated under suitable conditions with sufficient plates to distill overhead substantially all the $C_5$ hydrocarbons with a minor amount of low-boiling $C_6$ hydrocarbons. Column 10 may have 25 plates above and 25 plates below the feed inlet from line 9 and be operated under a pressure of 30 to 35 p. s. i. g. The $C_5$—$C_6$ overhead vapors at a temperature of 165°–170° F. are withdrawn through line 11 to cooler 12 for partial condensation, and the reflux is returned to the upper part of the column by line 13. The remainder of the overhead vapors from column 10 are withdrawn through line 14 for use in recovering valuable components such as isoprene and piperylene. With a bottoms temperature of 230°–240° F. in column 10, the bottoms product is kept rich in $C_6$—$C_7$ hydrocarbons and boiling within the narrow range of 158° F. to 240° F. This bottoms product from column 10 makes a satisfactory charging stock for the subsequent phosphoric acid polymerization carried out in vessel 16.

Vessel 16 is charged with a phosphoric acid catalyst. The liquid stream of $C_6$—$C_7$ hydrocarbons led into vessel 16 by line 15 from the bottom of column 10 is contacted with the phosphoric acid catalyst under conditions that maintain the hydrocarbons completely in the liquid phase at temperatures in the range of 250°–450° F. and under superatmospheric pressures of 100–400 p. s. i. g. at 0.2–1.0 v./v./hr. The unreacted liquid hydrocarbons carry along the liquid polymers formed as effluent passed from vessel 16 through line 17 into fractionating column 18. In fractionating column 18, a fractionation is carried out to separate $C_6$ and $C_7$ hydrocarbons as distillates.

The hydrocarbon vapors passed overhead from column 18, are led by line 19 to a cooling condenser 20 for partial condensation to supply reflux which is returned to one of the upper plates of the column 18 by line 21. The remainder of the overhead vapor product is the desired benzene concentrate and is withdrawn through line 22. This benzene concentrate stream of low paraffin and low olefin content has a benzene purity near 90 wt. per cent without further treatment even if this cut is made without extraordinary fractionation. For example, if the benzene overhead stream has a boiling range of 165°–185° F., it will contain 80–90 wt. per cent benzene, 4–8 wt. per cent cyclohexane, 4–5 wt. per cent hexanes, and 2–3 wt. per cent $C_6$ olefins, such as cyclohexene.

A $C_7$ toluene-containing fraction boiling in the range of 185°–240° F. may be removed from column 18 by the side stream line 23 about 15–20 plates from the top, or 15–20 plates above the feed inlet from line 17, and this stream will have a composition of approximately 80–90 wt. per cent toluene, 1–2 wt. per cent paraffins, and 2–3 wt. per cent olefins.

The column 18 may have about 15 to 30 plates in its stripping section below the feed plate, and since high boiling polymeric materials are present in its feed fairly high reboiling temperatures are required. The bottoms or residual fraction is withdrawn by line 24 from column 18. A portion of the bottoms may be recycled through a reboiler 25 and line 26 to supply heat needed in column 18. The bottoms product stream withdrawn by line 24 is substantially a 100% olefinic hydrocarbon material boiling mainly in the range of 360°–600° F. The polymerized olefinic material in the bottoms product from column 18 has a high heat stability, considering that the column 18 can be operated with bottoms temperatures of 400°–450° F. to strip out the $C_6$ and $C_7$ aromatics with slight depolymerization effects that would cause recontamination of the aromatic distillates.

The operation described with reference to the flow plan in the drawing is intended to show particularly the preferred manner for arriving at the proper feed for the phosphoric acid polymerization treatment and it should be understood that there may be modifications made in the procedure.

To evaluate the procedure, a light naphtha fraction product of vapor-phase cracking was first subjected to thermal soaking, as in vessel 2, at about 220° F. for eight hours to selectively dimerize cyclodienes, then distilled, as in column 3, to eliminate the cyclodiene dimers as bottoms, the starting light naphtha fraction being substantially free of $C_4$ hydrocarbons. After eliminating the cyclodiene dimers from the fraction, the thus treated fraction was subjected to a mild clay polymerization treatment. On further fractionating the clay treated naphtha fraction to eliminate the clay formed polymers and analyzing the distillate it was found that this fraction contained substantial amounts of olefins and diolefins which were close-boiling to the benzene.

A light naphtha fraction which had been subjected to mild polymerization conditions was redistilled to obtain a narrow $C_6$—$C_7$ fraction boiling almost entirely within the range of 158° F. to 185° F. and substantially freed of cyclodienes. This narrow cut represented 28 volume per cent of the initial light naphtha and contained approximately 60 volume per cent benzene, 37 volume per cent olefins and diolefins, and only 3 volume per cent paraffins. This narrow cut material was then treated by contact with $P_2O_5$ catalyst for three hours at 300°–340° F. under a pressure of 200 p. s. i. g. Distillation and analysis of the treated material is given in the following table,

TABLE I

*Treated benzene fraction*

| Distillation Data, ° F.[1] | Vol. Percent | Wt. Percent | Br₂ No. | Analysis | | |
|---|---|---|---|---|---|---|
| | | | | Benzene, Vol. Percent | Olefins, Vol. Percent | Paraffins, Vol. Percent |
| I. B. P. to 170.6° F | 5.1 | 4.6 | 22 | 44–45 | 11–12 | 43 |
| 170.6–179.6 | 66.8 | 67.0 | 0 | 93.0 | trace | 7 |
| 179.6–203 | 1.3 | 1.2 | 72 | 58–60 | 40–42 | trace |
| 203–356 | 2.5 | 2.2 | | | | |
| 356–428 | 9.7 | 9.4 | | | | |
| 428+ | 14.6 | 15.6 | | | | |

[1] Distillation at 20/1 reflux, 30 plates in 1-inch Oldershaw column.
[2] Olefin concentration estimated from bromine number. Paraffins by the $H_2SO_4$ (fuming) absorption in acetic acid medium. Aromatics by difference except 170.6°–179.6° F. fraction which showed 93 wt. percent by freezing point.

The results given in Table I demonstrated that the small amount of paraffins present in the initial feed tended to be concentrated in the lightest ends and that the benzene was concentrated very satisfactorily in the second cut of 170.6°–179.6° F. boiling range with slight contamination by olefins or paraffins, thus indicating that substantially all the $C_6$ olefins which ordinarily azeotrope with benzene had been reacted to form higher boiling hydrocarbons from which the benzene could be easily separated by fractional distillation. There was slight loss of benzene by alkylation or formation of azeotropes with the other types of components, the main loss with respect to the formation of azeotropes being in the lightest ends. Furthermore, there was slight loss in the formation of high molecular weight polymers boiling outside the naphtha range, i. e., boiling above 428° F.

From the general operations made in carrying out the $P_2O_5$ or phosphoric acid polymerization on the $C_6$—$C_7$ rich fraction, there are indications that it is desirable to have these fractions contain as little as possible of olefinic and paraffinic hydrocarbons boiling below 170° F., particularly less than 5 volume per cent of such components.

Comparative runs were made on the same type of charging stock using the phosphoric acid catalyst polymerization to ascertain the correct conditions of operation and the manner in which the correct polymerization operation makes a change in the component distribution. Representative data on these comparative runs are exemplified in the following tabulation:

TABLE II

*$P_2O_5$ treatment of light naphtha distillate (158°–185° F.) from clay polymerization treatment*

|  | Original | Treat #1 | Treat #2 |
|---|---|---|---|
| Conditions: |  |  |  |
|   Temperature, ° F |  | 350 | 325. |
|   Pressure |  | 1 atm | 200 p. s. i. g. |
|   Feed Rate, V./V./Hr |  | 0.5 | 0.3. |
| Analysis: |  |  |  |
|   Component Distribution— |  |  |  |
|     I. B. P. to 174.2° F | 31.9 | 23.3 | 8.4. |
|     174.2°–177.8° F | 62.0 | 39.0 | 61.4. |
|     177.8°–203° F | 6.0 | 28.0 | 1.2. |
|     203°–428° F |  |  | 11.3. |
|     428° F.+ |  |  | 15.3. |
|     Loss | 0.1 | 10.0 | 2.4. |
| Benzene, Purity of 174.2°–177.8° F. fraction. | ¹ 73 | 33 ¹ | >90.² |
| Octane Data (Index No.) |  |  | 207. |

¹ By ultraviolet.
² Determined by freezing point.

The results of the comparative experiments such as shown in Table II indicated that it was essential to use superatmospheric pressures of at least 100 p. s. i. g. to bring about selective conversion of the olefinic components close-boiling to benzene and the higher boiling components. These experiments also indicated the need for excluding as much as possible $C_5$ and light $C_6$ hydrocarbons boiling up to 170° F. with the object of concentrating nearly pure benzene in the fraction boiling in the range of 170° to 180° F.

It will be understood that in addition to the procedure described in detail, other steps may be added, such as treating with sulfuric acid, azeotropic distillation, or extractive distillation for obtaining the aromatic hydrocarbon as a concentrate of still greater purity following the phosphoric acid polymerization treatment.

Broader aspects of this invention are claimed in co-pending application Ser. No. 245,563, filed September 7, 1951, and now allowed. A variation using clay polymerization instead of the presently claimed phosphoric acid polymerization and designed to yield a polymer product of optimum quality is claimed in co-pending application Ser. No. 277,423, of even date herewith.

The main features and steps of the operation constituting the present invention are as follows:

1.—Treatment and fractionation of a vapor-phase cracked naphtha to obtain a $C_6$—$C_7$ fraction substantially free of $C_5$ and lighter hydrocarbons, also preferably freed of cyclodienes, of $C_8$ and higher hydrocarbons.

2.—Treatment of the $C_6$—$C_7$ hydrocarbon fraction with phosphoric acid catalyst or $P_2O_5$ catalyst under conditions for maintaining the hydrocarbons in liquid phase at temperatures in the range of 250° F.–450° F., more preferably in the range of 300°–340° F. under pressures of about 200 p. s. i. g.

Having described the invention it is claimed as follows:

In a process of recovering and concentrating benzene from a $C_5$—$C_8$ fraction of vapor-phase cracked petroleum oil, said fraction containing predominantly olefins, diolefins, and aromatics, the steps which comprise heating the fraction in liquid phase at temperatures of 180° F. to 240° F. for a period of 4 to 8 hours to selectively polymerize cyclic diolefin components of the fraction, separating unreacted $C_5$—$C_7$ components of the fraction from $C_8$ and higher components, refractionating the $C_5$—$C_7$ components to remove $C_5$ components and produce a $C_6$—$C_7$ bottoms fraction containing less than about 5 volume percent of hydrocarbons boiling below 170° F., passing the resulting $C_6$—$C_7$ fraction in liquid phase into contact with a phosphoric acid catalyst at 300°–340° F. under a pressure of about 200 p. s. i. g. to selectively polymerize $C_6$—$C_7$ olefins and diolefins among said components, then distilling a benzene fraction from a mixture containing polymers of the $C_6$—$C_7$ olefins and diolefins.

References Cited in the file of this patent

UNITED STATES PATENTS

| 2,257,078 | Soday | Sept. 23, 1941 |
| 2,308,001 | Forney | Jan. 12, 1943 |
| 2,366,570 | Souders et al. | Jan. 2, 1945 |
| 2,375,464 | Borden | May 8, 1945 |
| 2,400,355 | Jones et al. | May 14, 1946 |
| 2,414,651 | Latchum | Jan. 21, 1947 |
| 2,636,056 | Jones | Apr. 21, 1953 |

FOREIGN PATENTS

| 226,188 | Great Britain | Mar. 29, 1926 |